Oct. 18, 1960 P. G. HOLT 2,956,341
APPARATUS FOR INDICATING WIDTH VARIATIONS IN
A LONGITUDINAL, CATAPULT CYLINDER SLOT
Filed Oct. 6, 1959 3 Sheets-Sheet 3
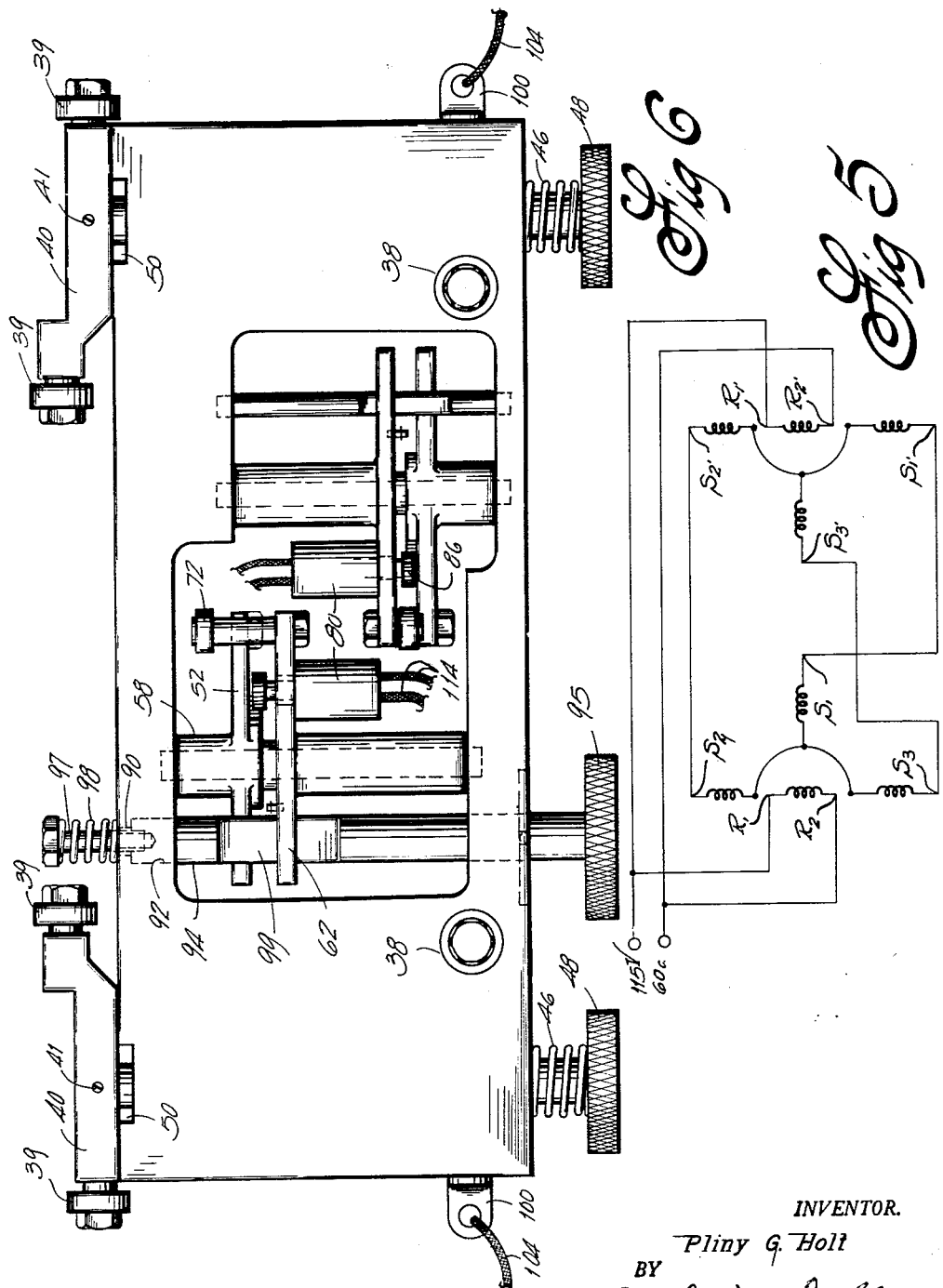
INVENTOR.
Pliny G. Holt
BY
Arthur L. Collins
ATTORNEY

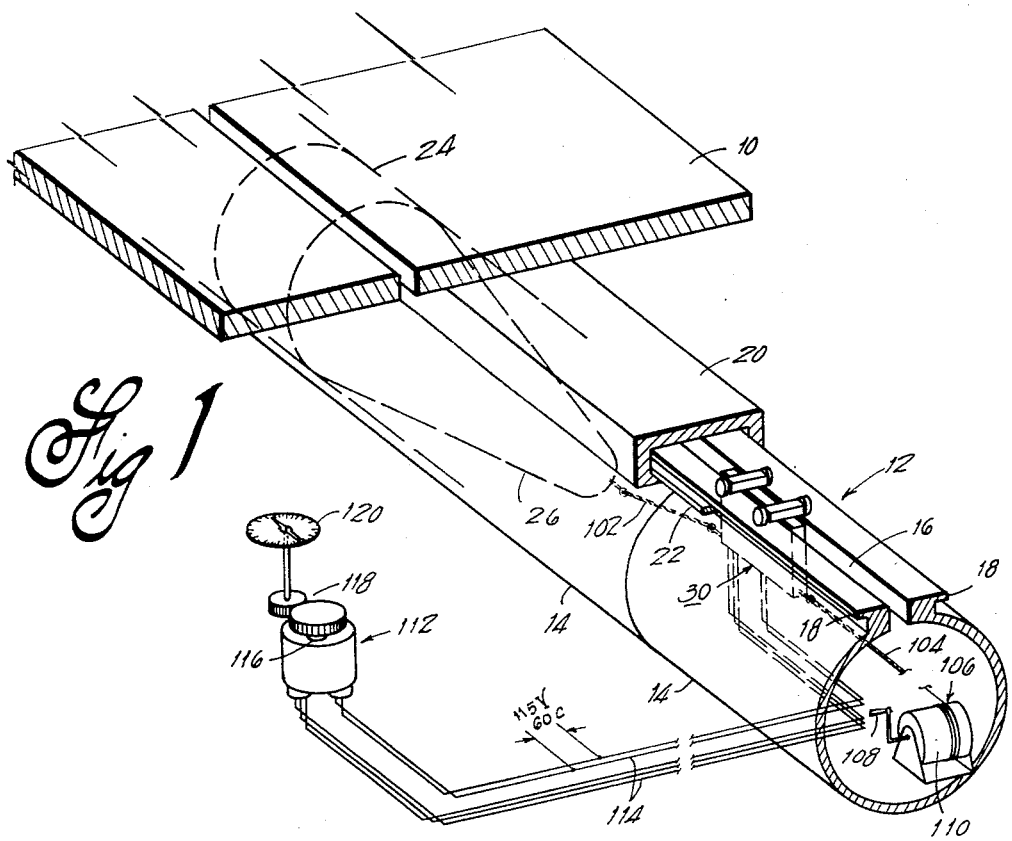
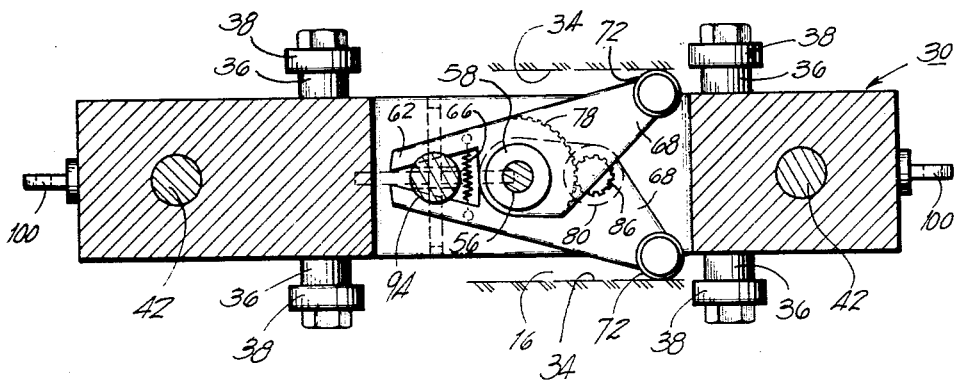

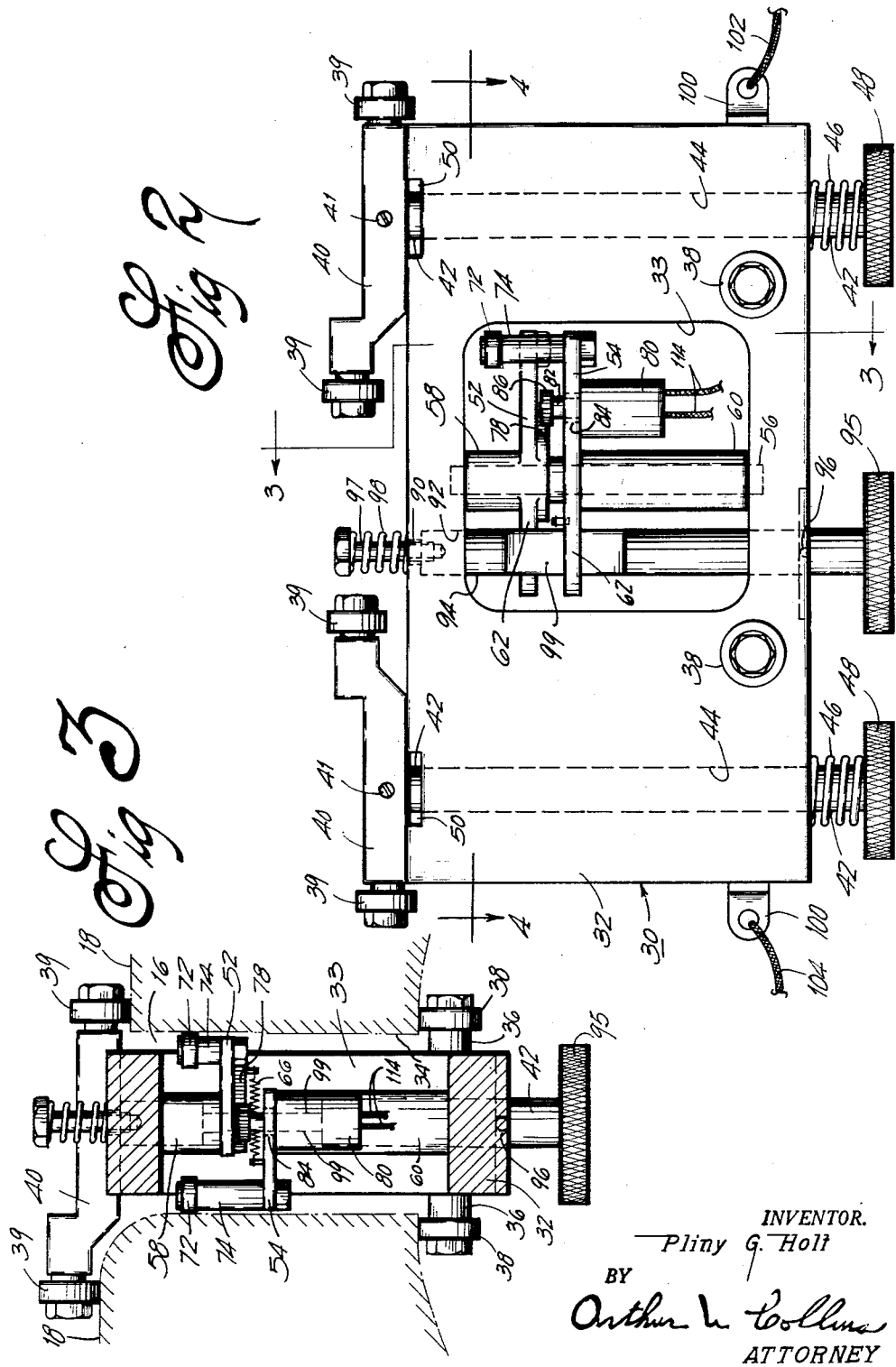

United States Patent Office

2,956,341
Patented Oct. 18, 1960

2,956,341

APPARATUS FOR INDICATING WIDTH VARIATIONS IN A LONGITUDINAL, CATAPULT CYLINDER SLOT

Pliny G. Holt, Philadelphia, Pa., assignor to the United States of America as represented by the Secretary of the Navy Filed Oct. 6, 1959, Ser. No. 844,833

2 Claims. (Cl. 33—148)

(Granted under Title 35, U.S. Code (1952), sec. 266)

The invention described herein may be manufactured and used by or for the Government of the United States of America for governmental purposes without the payment of any royalties thereon or therefor.

This invention relates to measuring instruments and particularly those for indicating width variations in the longitudinal slot of an aircraft catapult cylinder.

The usual catapult cylinder is disposed horizontally beneath a take-off surface such as a ship's deck and has a longitudinal slot in its upper side which is partially defined by external longitudinal flanges. The piston within the cylinder has a lateral arm that protrudes through the cylinder slot and a slot in the deck. The arm is attached to a mechanism, as a shuttle, which couples to aircraft that is to be launched from the deck. Leakage of fluid through the cylinder slot is prevented by a C-type cover or clamp that embraces the slot flanges together with an elongated sealing strip. Portions of the sealing strip are sequentially displaced and replaced with motion of the piston to allow movement of the arm.

The cylinder on aircraft carriers is approximately two hundred forty feet long and is formed by joining together a number of twelve foot sections with welds or other means. The cylinder bore is roughly eighteen inches in diameter. At times, because of wear or uneven expansion and contraction in the cylinder sections brought about by the difference in metals used to make the cylinder sections, the operating conditions, or other reasons, the cylinder slot may be wider or narrower than desired in some of the sections. A slot that is too wide makes sealing difficult and excess cylinder fluid will be lost; a too narrow slot will cause binding or sticking of the piston. In either case there is a loss of launching power which behooves determination of the faulty sections and their repair or replacement in situ.

Heretofore the deck and C-clamp were removed to provide access to the slot for caliper measurements from outside the cylinder. The extent of the work required by this method is apparent considering the cylinder's length, etc. Measurements were also made from within by slightly built personnel crawling into the cylinder. In both methods, however, with the use of steam powered catapults, the time lost waiting for cooling so that the cylinder could be touched, in addition to the inherent slowness of the measuring techniques, was excessive.

It is, therefore, the object of this invention to provide a novel device by which cylinder slot width variations may be located without the disadvantage referred to previously.

Another object is to provide a device for indicating slot width variations which is mountable in the longitudinal slot of a catapult cylinder for movement into the cylinder with piston motion and capable of recording such variations externally of said cylinder.

A further object is to provide a width deviation indicating device that is moveable with piston movement in a longitudinal, catapult slot and whereby mechanical movements produced by width changes are converted into electrical signals that are transmitted, for recordations, externally of said cylinder.

Various other objects will be apparent from the following description when read in light of the accompanying drawings.

In the drawings, which illustrate the preferred embodiments of the invention, and wherein similar reference numerals, are used throughout the several views to designate corresponding parts, Figure 1 is a perspective view of a catapult cylinder, parts of which are broken away, having the entire invention, some of the elements of which are shown schematically, applied to it;

Figure 2 is an enlarged, side elevational view of the slot width indicator assembly;

Figure 3 is a lateral cross-sectional view of the indicator taken on line 3—3 of Figure 2 showing it positioned in a catapult slot;

Figure 4 is a view of the indicator similar to Figure 3 but a longitudinal cross-section taken on line 4—4 of Figure 2;

Figure 5 is a wiring diagram of the synchro transmitter and receiver;

Figure 6 is a view similar to Figure 2 showing a variation in the invention.

In detail, the numeral 10, in Figure 1 of the drawings, designates an aircraft take-off deck beneath which is a conventional open-ended catapult cylinder 12 composed of a number of tubular sections 14 laid end to end and secured together by welds, bolted flanges, or some other well known joint, not shown. A slot 16 extends logitudinally in the upper part of the cylinder which is bounded by outwardly projecting flanges 18 and 18. A clamp 20, C-like in cross-section, is mounted over the flanges 18 and 18; it holds a sealing strip 22 against the outer surface of one of the flanges. A piston 24 is moveable longitudinally within the cylinder 12 and has the usual spear 26 extending from its head. A lateral arm, not shown, is carried by the piston 24; this extends out of the cylinder 12 by passing through the slot 16, under the sealing strip 22 and between one of the flanges 18 and the clamp 20. Catapult forces are transmitted by the arm to a shuttle (not shown) disposed externally of the cylinder 12.

The invention as applied to the cylinder described above, broadly, includes an indicator 30 capable of converting angular mechanical movements into electrical signals, a receiver 112 which reconverts electrical signals into mechanical moments on a dial together with accessory elements such as a reel 106, and cables 102 and 104, by which the indicator 30 is moved, and wiring or electrical lines 114 connecting the indicator 30 to the receiver 112. The indicator 30 is mountable for longitudinal movement within the cylinder slot 16; whereas, the other elements are fixed externally of it at some convenient point.

The indicator 30 has a frame or body 32 of rectangular shape in which there is a central cut out 33. The body thickness is slightly less than the slot width, and its height is preferably about equal to the width of the vertical walls 34 defining the slot 16. A pair of fixed, lower axles, 36 and 36, pass through the frame 32 and carry a wheel 38 on each of their extremities. The wheels are adapted to roll on the inner wall of the cylinder on either side of the slot 16. Wheels 39 are also provided on a pair of pivotable axles, 40 and 40, mounted on the top of frame 32. The axles, 40 and 40, span the slot 16 so that each of the wheels 39 rides on one of the flanges 18 and 18 as is shown in Figure 3. The axles, 40 and 40, are preferably rectangular in cross-section, and dog-legged at one end to accommodate a difference in elevation in the flanges as seen in Figure 3. At their centers the axles, 40 and 40, are rigidly secured by welds, a dove tail and set screw joint as indicated at 41, or other means, to the top of a rod, 42—42, that protrudes above the frame 32. The rods, 42 and 42, are rotatably mounted in vertical holes, 44 and 44, that pass through the indicator frame 32. A spring 46 is carried by each of the rods 42 and is flanked by the lower side of the frame 32 and a knob 48 secured to the terminal end of the rod. The axles, 40 and 40, are biased downwardly by the springs, 46 and 46, and are pivoted from the longitudinal position shown in Figure 2 to the lateral position of Figure 3 with turning of the knob 48.

A lateral countersunk portion 50 is provided in the top of the indicator frame 32 at the rod hole 44 for receiving the axle 40 in its lateral position (Fig. 3) and preventing its rotation when so positioned. As is apparent from the drawings the axle 40 must be raised from the countersunk portion 50 before it may be returned to a longitudinal position. This is achieved with the application of an upward force on the knob 48 followed with a turning of it.

The numerals 52 and 54 designate the measuring arms of the indicator that contact the walls of slot 16. These members, 52 and 54, are levers pivoted intermediate their ends on a vertical shaft 56 which is fixed in the cut out 33 of the indicator frame 32. Sleeves, 58 and 60, integral with the arms extend along the shaft and act as spacers by which the arms maintain a definite vertical position on the shaft.

The inner extremities or ends, 62 and 62, of the members, 52 and 54, are connected by a spring 66 which urges the outer extremities or ends, 68 and 68, away from the frame 32. Rollers, 72 and 72, mounted on rods, 74 and 74, secured to the outer ends are adapted to roll on the walls defining the slot 16.

The arm 52 near its pivot and on its underside is provided with a gear sector 78 that is integral with the arm; whereas, a synchro transmitter 80 is secured to the arm 54 in a like position. The rotor shaft 82 of the transmitter passes loosely through a hole 84 in the arm 54 and carries a pinion gear 86 on its end which interengages the gear sector 78. By this construction the arms 52 and 54 are differentially connected to the synchro transmitter 80 whereby movement of either of them will change the position of the transmitter's rotor relative to its field.

To provide a means for holding the outer ends, 68 and 68, of arms 52 and 54 out of contact with the walls of slot 16 until desired, the indicator frame 32 at the cut out portion is provided with a hole 90 aligned with a bore 92 in which a shaft 94 is vertically mounted. A pin 96 together with a bolt 97 and spring 98 hold the shaft 94 in position. Shaft 94 has a reduced portion formed by cutting away the shaft on opposite sides to produce two flats, 99 and 99. The reduced portion of the shaft 94 is disposed between the inner ends, 62 and 62, of the arms 52 and 54. A knob 95 is secured on an end of the shaft 94 which extends from the indicator frame 32 to provide a means by which the shaft may be turned. Turning the shaft 94 until its flats, 99—99, are not parallel with the axes of the arms, 52 and 54, will separate the arms' inner ends, 62 and 62, and thus bring the outer ends, 68 and 68, inward, away from the slot walls, 34—34. Further turning brings the flats parallel with the arms; spring 66 then pulls the inner ends, 62 and 62, inward and the outer ends move toward the slot walls.

For towing the indicator through the catapult cylinder 12 the front and back sides of the frame 32 each have a towing eye 100 to which a cable is tied. The cable 102 at the back side is also secured by a clamp or other means, not shown, to the spear 26 on the cylinder piston for movement of the indicator into the cylinder with retraction of the piston. Cable 104 at the front of the indicator is wound on a reeling mechanism 106 from which it is paid off when the indicator moves inward, and onto which cable 104 is rewound to bring the indicator out of the cylinder.

Reeling mechanism 106 is a conventional winch type of device having a handle 108 by which a drum 110 may be turned. It is mounted near the forward or open end of the cylinder 12 in any conventional, suitable manner.

Located near the reeling mechanism 106 is a synchro receiver 112. Lines 114 electrically connect it with synchro transmitter 80. These may also be wound on the reeling mechanism 106. For this purpose, it is desirable that the drum of the reel be divided so that cable 104 is wound on one half of it and the electrical lines on the other half. However, it is preferred, because of complexities in making connectings from the lines on the rotating drum to the receiver 112, that separate drums be used (not shown) or that the electrical lines do not be reeled. In the latter case the lines are pulled out from the cylinder and coiled conveniently by hand.

The rotor 116 of the synchro receiver 112 is connected by gearing 118 or other means to a dial indicator 120, shown schematically in Figure 1, which may be of some conventional design.

The construction of the synchro transmitter 80 and the receiver 112 is the same and their operation is basically that of a single phase transformer. Each has a rotor and a three winding Y-connected stator. However, in the transmitter, the rotor is the primary and the stator winding is the secondary; whereas in the receiver the reverse is true.

The synchro transmitter 80 is connected to the synchro receiver 112 as shown in Figure 5 in which the same reference characters are used for both but primed for the receiver. Thus, the R1 and R1' terminals of the transmitter and receiver rotors are connected to one side of a 115 volt 60 cycle A.-C. supply line and the R2 and R2' to the other side of the supply line to provide them with a small magnetizing current. Their stator coils are connected S1 to S1', S2 to S2' and S3 to S3' so that the induced voltage in each of the transmitter stator coils opposes that in the corresponding receiver stator coil.

When the rotors of the transmitter and receiver have the same relative position with respect to their stators, that is, they are in correspondence, no current flows from the transmitter stator to the receiver stator. Turning the transmitter, as with movement of either arm 52 or 54, through any angle to put the rotors out of correspondence will induce current to flow between the stators to supply power which will cause the receiver rotor to turn the same angle as the rotor of the receiver has been turned. Angular motion of the indicator arm, 52—54, mechanically positions the transmitter rotor and the angle through which the receiver rotor follows through as a result is transmitted mechanically to the dial 120.

In using the invention, the piston 24 of cylinder 12 is moved to its forward or open end. The indicator's pivoted axles, 40—40, are placed in their longitudinal position (Fig. 2), and shaft 94 turned to bring the outer ends, 68 and 68, inward on the indicator frame 32. The indicator is then positioned in slot 16 by raising it upward from within the cylinder. The axles, 40 and 40, are then turned to their lateral positions to mount the indicator as shown in Figure 3, and shaft 94 turned to allow the outer ends, 68 and 68, of arms 52 and 54 to move outwardly into contact with the walls of slot 16. Cable 102 is secured to the spear 26 of the catapult piston 24, which can then be moved into the cylinder in stop-start sequences, if desired, and cable 104, of course, being payed out from reel 106. Angular motion of arms 52 and 54 in response to difference of width of slot gap 16 moves the transmitter rotor relative its field which motion is simultaneously made by the receiver rotor and in turn indicated on the dial 120. The points within the cylinder at which differences in reading from an established standard are found is determined by measuring the amount of cable 104 fed into the cylinder.

In the event slot 16 is tapered vertically, indications of variation of the slot width at different elevations, as near the top as well as near the bottom, may be separately obtained by modifying the device as shown in Figure 6. This essentially comprises a duplication of certain elements. Thus, the cut out 34 in the indicator body 32 is provided with a second pair of arms, 52' and 54', and a synchro transmitter 80'. Likewise a second synchro receiver 112 and dial 120 are provided. The operation is the same, except that a second set of readings are obtained.

Mounting of the indicator 30 has been described as being achieved from within the cylinder 12. Obviously, headroom between the C-clamp 20 and the tops of flanges 18—18 permitting, mounting may take place from the top of slot 16. In this event, the indicator 30 is turned over so that the wheels 39 on the pivoted axles 40 will rotate on the inner wall of the cylinder 12 and the rollers 38—38 on the fixed axles ride 36—36 on the tops of flanges 18—18.

Obviously many modifications and variations of the present invention are possible in the light of the above teachings. It is therefore to be understood that within the scope of the appended claims the invention may be practiced otherwise than as specifically described.

What is claimed is:

1. In a device for indicating width variations of a longitudinal, catapult slot cylinder an indicator assembly comprising a frame adapted to enter said slot, fixed axles on said frame having rollers for movement over the inner surface of said cylinder, pivoted axles on said frame having rollers for movement over the external surface of said cylinder, pivoted arms biased outwardly from opposite sides of said frame having extremities for contacting the walls defining said slot, and electrical means in said frame differentially connected to said arms for converting into electrical signals movements of said arms which are responsive to slot width variations.

2. The device of claim 1 wherein said electrical means includes a synchro transmitter secured to one of said arms and having a rotor geared to the other of said arms.

References Cited in the file of this patent

UNITED STATES PATENTS

| | | |
|---|---|---|
| 2,030,244 | Cox | Feb. 11, 1936 |
| 2,091,534 | Templin | Aug. 31, 1937 |